(12) United States Patent
Li

(10) Patent No.: US 7,995,333 B2
(45) Date of Patent: Aug. 9, 2011

(54) SLIDING-TYPE PORTABLE ELECTRONIC DEVICE

(75) Inventor: Jian-Hui Li, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 168 days.

(21) Appl. No.: 12/578,172

(22) Filed: Oct. 13, 2009

(65) Prior Publication Data

US 2010/0265636 A1 Oct. 21, 2010

(30) Foreign Application Priority Data

Apr. 21, 2009 (CN) .......................... 2009 1 0301689

(51) Int. Cl.
*G06F 1/16* (2006.01)

(52) U.S. Cl. ................. 361/679.21; 345/697; 455/575.4; 349/122; 248/291.1

(58) Field of Classification Search ..................... 16/225, 16/307, 308, 250, 362, 277; 345/168, 1.3, 345/440, 204, 169, 697, 173, 174, 184; 455/575.4, 455/556.1, 575.3, 575.9; 361/679.21, 679.09, 361/679.01, 679.26, 679.56, 679.06, 679.11; 349/1, 73, 58, 122, 153, 59, 80; 248/286.1, 248/176.1, 276.1, 291.1, 288.51

See application file for complete search history.

(56) References Cited

U.S. PATENT DOCUMENTS

| | | | |
|---|---|---|---|
| 2008/0018605 A1* | 1/2008 | Prichard et al. | 345/168 |
| 2009/0199361 A1* | 8/2009 | Kao et al. | 16/225 |
| 2010/0240426 A1* | 9/2010 | Tanaka et al. | 455/575.4 |

* cited by examiner

*Primary Examiner* — Hung Duong
(74) *Attorney, Agent, or Firm* — Steven M. Reiss

(57) ABSTRACT

A sliding-type portable electronic device includes a main body having a first display, a first cover, and a second cover. The first cover and the second cover are slidably assembled on the main body. When the sliding-type portable electronic device is closed, the first cover and the second cover cooperatively cover the first display.

6 Claims, 3 Drawing Sheets

SLIDING-TYPE PORTABLE ELECTRONIC DEVICE

BACKGROUND

1. Technical Field

The present disclosure generally relates to sliding-type portable electronic devices.

2. Description of Related Art

Nowadays, portable electronic device such as mobile phones, laptops and personal digital assistants (PDAs) are widely used. Generally, the portable electronic device can be classified into three or more types including bar-type, flip-type, and sliding-type.

Generally, the sliding-type of the portable electronic device includes an upper housing having a display exposed from the upper housing, a lower housing and a sliding mechanism. However, the sliding distance of the upper housing is limited by the sliding mechanism. The sliding distance of the upper housing usually cannot exceed about two thirds of length of the lower housing. Therefore, the lower housing only has about two thirds of its surface area to define keys. Due to the small key assembly area, the size of each key may be limited and inconvenient to operate. In addition, the display is exposed from the upper housing, thus the display may be scratched.

Therefore, there is a room for improvement within the art.

BRIEF DESCRIPTION OF THE DRAWINGS

Many aspects of sliding-type portable electronic device can be better understood with reference to the following drawings. The components in the drawings are not necessarily to scale, the emphasis instead being placed upon clearly illustrating the principles of the sliding-type portable electronic device. Moreover, in the drawings, like reference numerals designate corresponding parts throughout the several views.

DETAILED DESCRIPTION OF THE EMBODIMENTS

Figure 1:
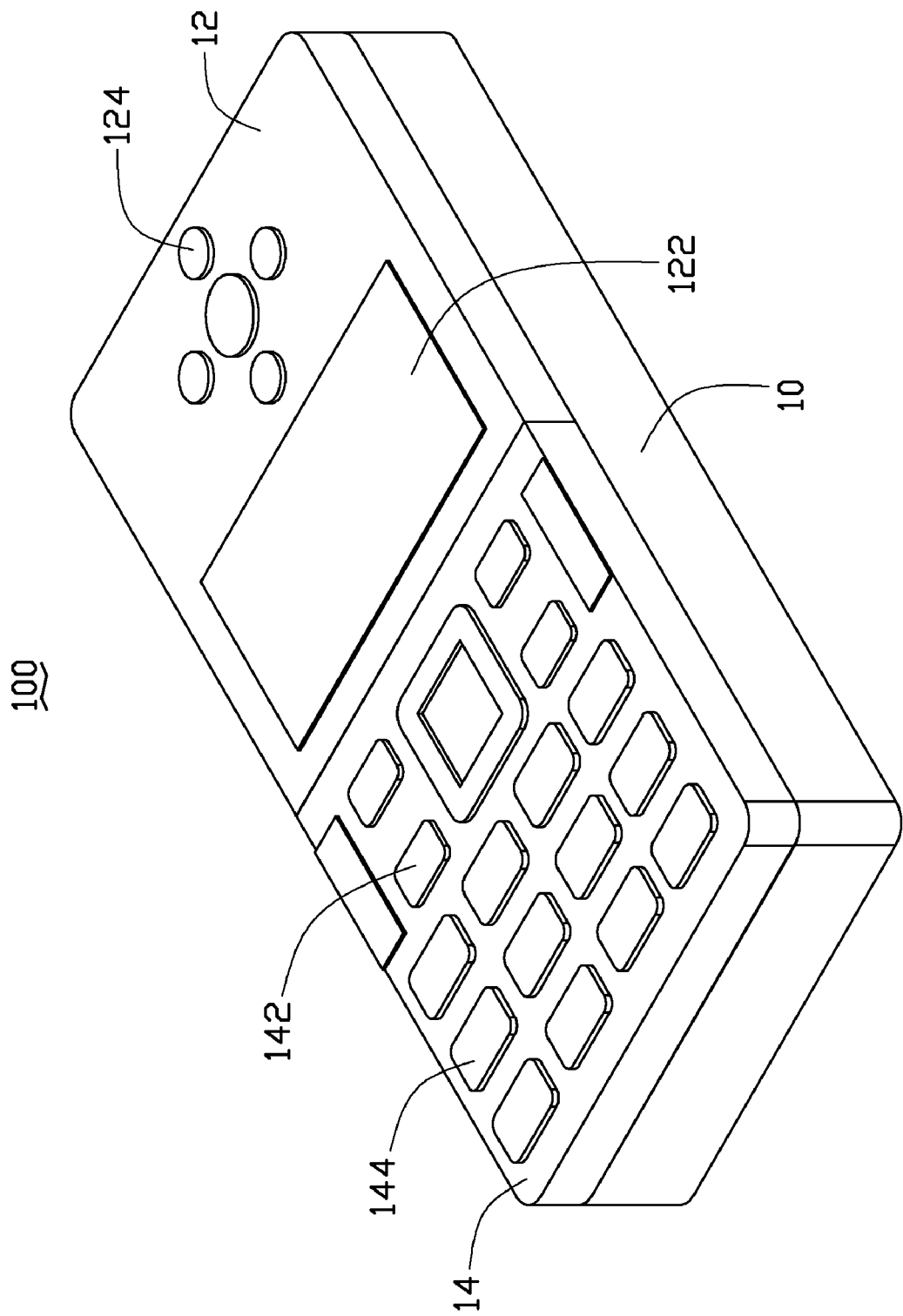
FIG. 1 is an isometric view of a sliding-type portable electronic device in closing condition according to an exemplary embodiment.
Figure 2:
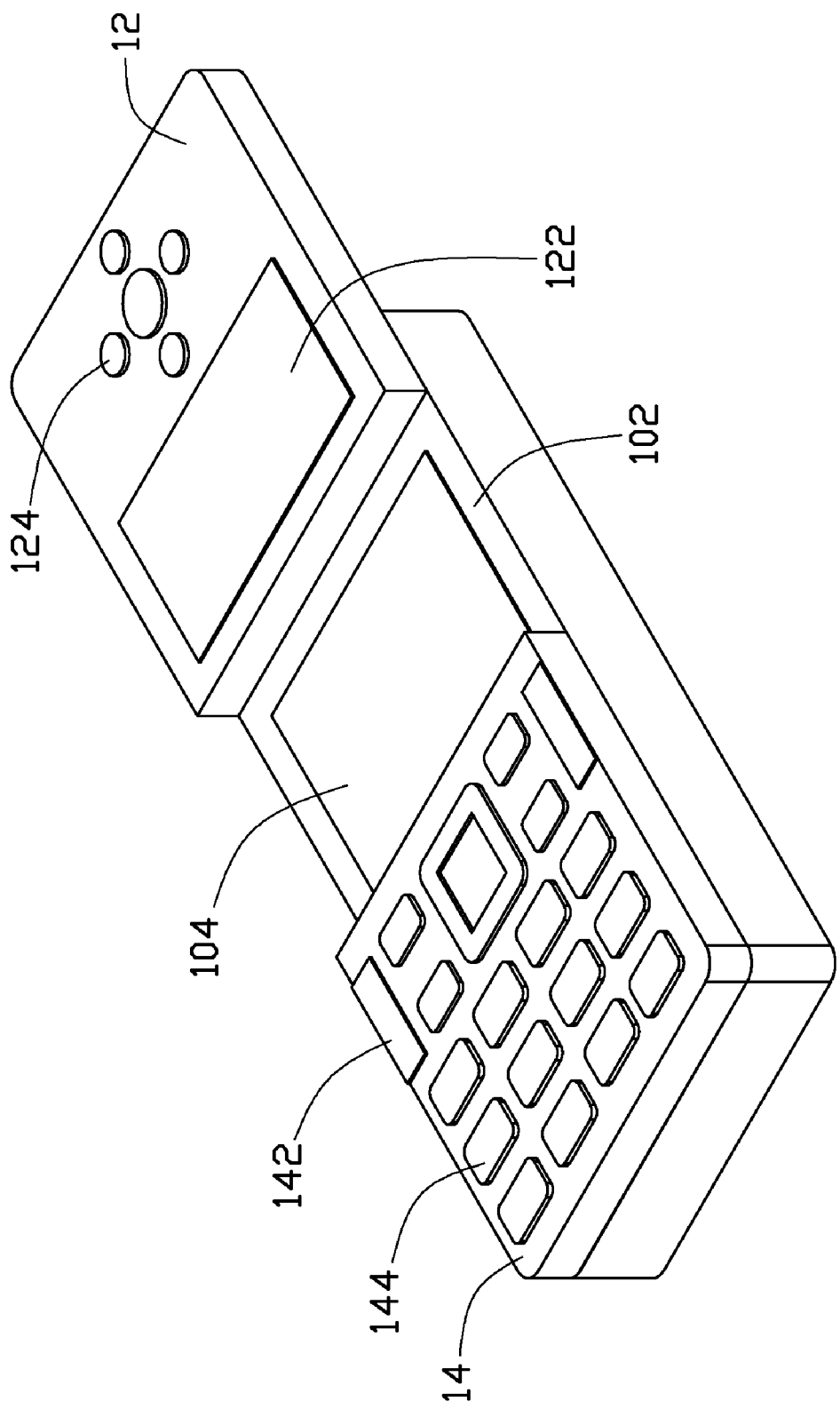
FIG. 2 is an isometric view of a first sliding cover of the portable electronic device in opening condition.

FIG. 1 and FIG. 2 show a sliding-type portable electronic device 100 including a main body 10, a first cover 12, and a second cover 14. The first cover 12 and the second cover 14 are slidably assembled to the main body 10.

The main body 10 includes a top wall 102 having a first display 104. The first display 104 can display primary information like operation menus, message information and etc.

The first cover 12 is substantially half the length of the main body 10. The first cover 12 has a second display 122 and a plurality of buttons 124 positioned thereon. The second display 122 can display secondary information like the time. The first cover 12 is slidably assembled on the top wall 102 by a sliding mechanism (not shown).

The second cover 14 is also substantially half the length of the main body 10. The second cover 14 also has a plurality of buttons, for example, function keys 142 and number keys 144, positioned thereon. The second cover 14 is slidably assembled on the top wall 102 by the sliding mechanism (not shown).

When the sliding-type portable electronic device 100 is in a closed position, an end wall of the first cover 12 abuts an end wall of the second cover 14. The first cover 12 and the second cover 14 cooperatively cover and completely shield the first display 104.

Figure 3:
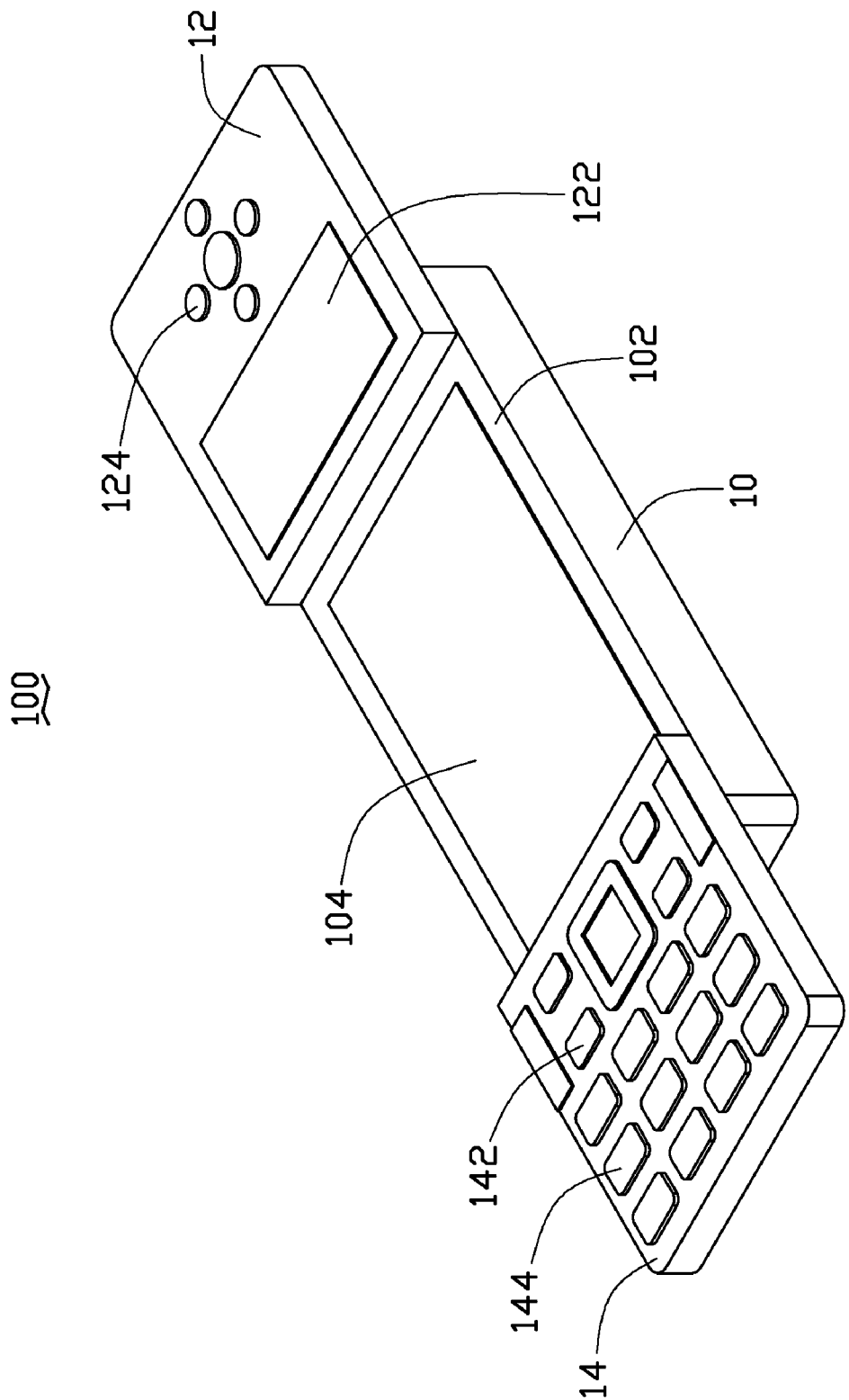
FIG. 3 is an isometric view of the first sliding cover and a second sliding cover of the portable electronic device in opening condition.

Referring to FIG. 3, the first cover 12 and the second cover 14 are shown as opened. The first cover 12 and the second cover 14 can slide away from each other, exposing substantially the entire first display 104.

The sliding-type portable electronic device 100 includes two covers slidably assembled on the main body 10. The two covers can cooperatively shield the first display 104. Thus, the first display 104 may be protected. Because the buttons 124, the function keys 142, and the number keys 144 are positioned on the two covers and not the main body 10 or only one of the covers, the size of the keys or buttons may be increased. Thus, uses can easily operate the keys or the buttons.

It is to be understood that the first display 104 may be a touch screen, accordingly, the number keys 144 can be omitted.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sliding-type portable electronic device, comprising:
   a main body having a first display;
   a first cover for covering a portion of the main body; and
   a second cover for covering another portion of the main body;
   wherein the first cover and the second cover are slidably assembled to the main body, when the sliding-type portable electronic device is closed, the first cover and the second cover cooperatively cover the first display.

2. The sliding-type portable electronic device as claimed in claim 1, wherein the first cover includes a plurality of buttons positioned thereon.

3. The sliding-type portable electronic device as claimed in claim 2, wherein the second cover includes a plurality of buttons positioned thereon.

4. A sliding-type portable electronic device, comprising:
   a main body having a first display;
   a first cover including a plurality of buttons; and
   a second cover including a plurality of buttons;
   wherein the first cover and the second cover slidably assembled to the main body and can be positioned to cover the first display.

5. The sliding-type portable electronic device as claimed in claim 4, wherein the first display has a touch screen.

6. The sliding-type portable electronic device as claimed in claim 4, wherein the second cover has a second display positioned thereon.

* * * * *